United States Patent [19]

Carter

[11] Patent Number: 4,602,761
[45] Date of Patent: Jul. 29, 1986

[54] MARINE RADIO MOUNTING BRACKET

[76] Inventor: Gerald T. Carter, 11488 Boyne Blvd., Allendale, Mich. 49401

[21] Appl. No.: 644,565

[22] Filed: Aug. 27, 1984

[51] Int. Cl.⁴ ............................................. F16M 13/00
[52] U.S. Cl. .................................... 248/628; 248/207; 248/300; 312/7.1; 455/345
[58] Field of Search .................. 248/628, 225.2, 224.4, 248/224.3, 300, 339, 126, 207; 455/89, 346, 348, 345; 312/245, 246, 7.1

[56] References Cited

U.S. PATENT DOCUMENTS

| | | | |
|---|---|---|---|
| 448,359 | 3/1891 | Nichols | 248/225.2 |
| 575,928 | 1/1897 | Ives | 248/441 |
| 755,116 | 3/1904 | Dreyer | 248/224.4 X |
| 855,453 | 6/1907 | Foster | 248/225.2 |
| 1,049,913 | 1/1913 | Porter | 248/225.2 |
| 1,204,082 | 11/1916 | Stark | 248/442 |
| 1,349,402 | 8/1920 | Wiggers | |
| 2,124,945 | 7/1938 | Gross | 58/88 |
| 2,530,892 | 11/1950 | Mayo | 248/300 X |
| 2,595,752 | 5/1952 | Batts | 248/224.3 |
| 2,958,496 | 11/1960 | Johnson | 248/225.2 |
| 3,162,415 | 12/1964 | St. Pierre | 248/441 |
| 3,963,156 | 6/1976 | Perrin | 224/41 |
| 3,990,617 | 11/1976 | Carter | 224/45 |
| 4,052,030 | 10/1977 | Wright | 248/225.2 X |
| 4,299,344 | 11/1981 | Yamashita | 224/45 |
| 4,371,593 | 2/1983 | Ramey | 429/97 |

FOREIGN PATENT DOCUMENTS 616398 10/1933 Fed. Rep. of Germany ......... 225.2/

OTHER PUBLICATIONS

"Marking Molded Plastic Parts with Fixed Ink Marker", J. A. Jonelis, Western Electric Technical Digest, No. 55, Jul. 1979.

Primary Examiner—J. Franklin Foss
Assistant Examiner—David L. Talbott
Attorney, Agent, or Firm—Price, Heneveld, Huizenga & Cooper

[57] ABSTRACT

The portable marine radio mounting bracket having a resilient, V-shaped supported bracket to which a mounting plate is secured. The mounting plate has an open ended channel thereon which receives the support clip of the radio, and a pair of spaced side walls extend and diverge forwardly of the mounting flange to abut the sides of the mounted radio. The channel and side walls cooperate to resiliently lock the radio on the mounting plate, while the support bracket absorbs shocks or jolts imparted to the support bracket.

10 Claims, 5 Drawing Figures

MARINE RADIO MOUNTING BRACKET

BACKGROUND OF THE INVENTION

The present invention relates to mounting brackets and in particular to brackets for use in mounting portable marine radios.

Due to advances in radio technology, portable marine radios have developed widespread use for ship-to-ship and ship-to-shore communication. Such portable marine radios enjoy the advantage of being usable from any location on a ship or pier, as opposed to larger stationary marine radios having attached microphones. Normally, such portable marine radios have an elongated rectangular shape that allows the unit to be hand held. The microphone/speaker and controls are positioned on the front or top of the unit while the transmit-receive switch is located on the side of the unit to be accessible for operation by the carrying hand.

Although proving to be very versatile for marine use, such portable radios pose the disadvantage that a user does not normally wish to constantly carry the unit. While on land the radio can simply be laid on any support surface, onboard a marine vessel the movement of the vessel may jar and damage the radio unless it is properly secured.

To facilitate storage, many portable marine radios are equipped with a bayonet or spring biased securing clip on the reverse side of the unit. This clip may be hooked over a person's belt to carry the radio when not in use. Although alleviating the storage problem to some degree, boat owners do not always wish to carry the radio on their person, particularly if they are wearing light clothing or a swimsuit. Additionally, as the person moves about the boat it is possible for the radio to be disengaged from the wearer's belt, resulting in either damage to or loss of the radio.

SUMMARY OF THE INVENTION

The present invention relieves the problems noted above by providing a radio mount for portable marine radios which may be secured to a boat dashboard or the like. In accordance with the invention, the radio mount includes a radio securing element that provides support to the radio while also preventing lateral movement of the radio on the securing element. The mount provides for the absorption of vibration, shock or jarring that would otherwise be imparted to the radio.

In another aspect of the invention, the radio mount provides a channel for receiving the radio bayonet support clip while a pair of spaced side walls engage the radio housing and prevent lateral movement of the radio The channel and side walls cooperate to securely anchor the radio to the mount while providing for the ready removal of the radio for operation. In other aspects of the invention, the radio mount can be variously oriented in order to support the radio on variously angled surfaces, while still operating to buffer the radio from vibration, shock or jarring.

It will be appreciated that the radio mount of the present invention provides a lightweight, uncomplicated and inexpensive solution to the mounting problems noted above. When not in use the operator merely places the radio in the radio mount where it is secured from damage and loss. Due to its small size and adaptability to various mounting surfaces, a number of radio mounts may be placed at various accessible locations on the boat in order to facilitate the portable and accessibility features of the radio unit.

In addition to the above, the radio mount is relatively easily manufactured and requires a relatively small amount of material, so that the radio mount provides an inexpensive solution to the above problems.

These and other features, advantages, and objects of the present invention will be further understood and appreciated by those skilled in the art by reference to the following specification, claims and appended drawings.

DETAILED DESCRIPTION OF THE PREFERRED EMBODIMENTS

In the preferred embodiment, a portable marine radio mount 10 includes a support bracket 11 to which is connected a mounting bracket or panel 12. Support bracket 11 provides resilient support to panel 12 in order to act as a shock absorber and cushion vibration, shock or jarring that would otherwise be imparted to the radio when secured to mount 10. Mounting panel 12 provides a radio supporting cradle which positively secures the radio to radio mount 10 so that the radio does not shift relative to panel 12, thereby preventing vibration or rattling of the radio. Although positively securing the radio to mount 10, panel 12 provides for the ready removal of the radio from mount 10 so that the radio is available for immediate operation. To this end, mount 10 orients the radio to conveniently display the radio controls so that a user may quickly and easily visually inspect and manipulate the control settings without removing the radio from mount 10.

Figure 1:
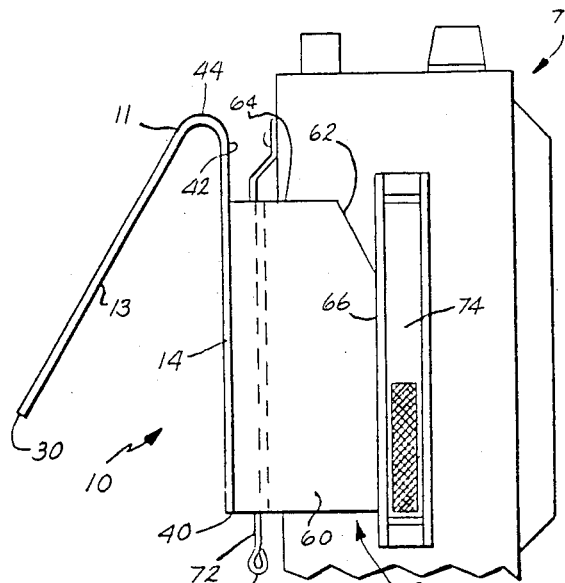
FIG. 1 is a side elevational view of a radio mount embodying the present invention showing a fragmentary view of a portable marine radio mounted thereon.

More specifically, as shown in FIG. 1, support bracket 11 includes a securing leg 13 and a connecting leg 14 which are integrally joined by a "U" shaped bend so as to have an overall "V" configuration. Securing leg 13 is a generally planar rectangular plate having a lower edge 30. Spaced slightly above lower edge 30 are a pair of laterally spaced and aligned circular apertures 34, FIG. 3. Apertures 34 are sized to receive a pair of screws or other fasteners 36 used to permanently secure mount 10 to a support surface, FIGS. 4 and 5. Alternatively, securing leg may include keyhole slots (not shown) which mates with corresponding stud or studs on an appropriate support surface. With such a keyhole fastening system, mount 10 may be moved to various locations, but is securely fastened to each such location during use.

Connecting leg 14 is also a generally planar rectangular plate having a lower edge 40 and an outer face 42 which faces away from securing leg 13. Securing leg 13 and connecting leg 14 are formed from a single, elongated, rectangular strip of material that is bent to form two approximately equally sized flange sections joined by an integral resilient, smoothly curved bend 44. Although bend 44 allows flanges 12 and 14 to flex resiliently relative to each other, bend 44 may also be deformed beyond its elastic limit to vary the angle formed between legs 13 and 14. It is to be recognized that such deformation of bend 44 past its elastic limit is to be performed only a limited number of times while setting the optimal orientation of legs 13 and 14. Thereafter, bend 44 is only deformed elastically during the performance of its shock absorption function described below.

Mounting panel 12 is secured to outer face 42 on connecting leg 14 so as to face generally forwardly of securing bracket 11. Panel 12 includes a generally vertically aligned channel 46 of which one leg outer face 42 forms one wall. Channel 46 extends from lower edge 40 and terminates a short distance beneath bend 44, FIG. 2. As shown in FIG. 3, channel 46 is an open ended channel or slot formed by a front channel wall 50 that is offset from leg outer face 42 by a pair of forwardly converging channel side walls 52. As shown in FIG. 3, channel 46 has a narrow, generally trapezoidal cross section. Open ended channel 46 is configured to receive and support the anchor clip of a portable radio as described below.

Figure 2:
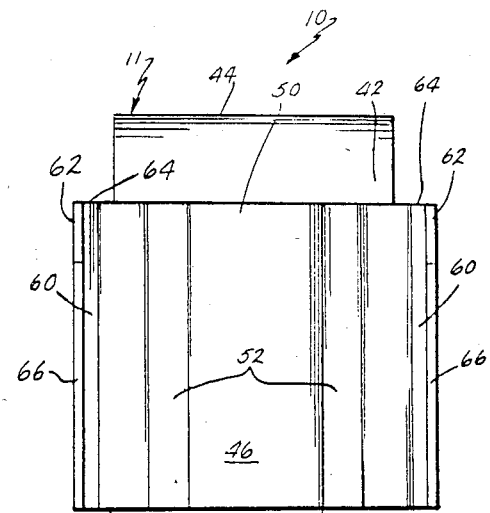
FIG. 2 is a front elevational view of the radio mount of FIG. 1.
Figure 3:
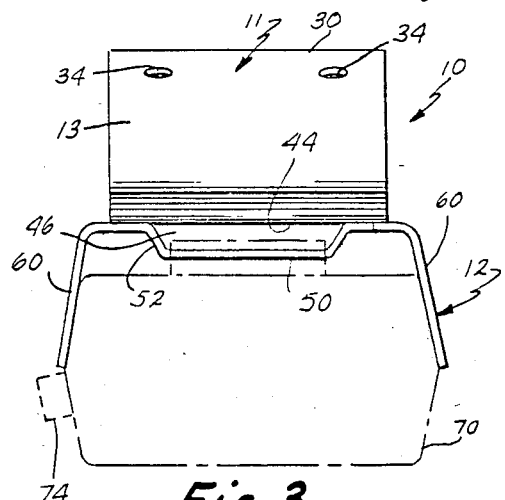
FIG. 3 is a plan view of the radio mount of FIG. 1 with a portable marine radio, shown in phantom, mounted thereon.

As shown in FIGS. 2 and 3, the outer edges of mounting panel 46 are bent into a pair of forwardly diverging panels or side walls 60. Side walls 60 are spaced slightly wider than the width of connecting leg 14 so that panel 14 forms a radio accommodating pocket between side walls 60 forward of channel 46. Side walls 60 in a preferred embodiment are planar walls that diverge at an angle corresponding to the configuration of the sides of the radio, but are spaced slightly less than the radio sides in order to resiliently separate and embrace the radio sides when the radio is mounted on mount 10. It will be recognized that the configuration of side walls 60 is, therefore, dictated by the configuration of the supported radio. Side walls having different alternative configurations may be used to correspond to and resiliently embrace the sides of radios having different housing shapes. The panel 12 forms a radio receiving pocket which is slightly deeper than the portion of the radio to be received therein, FIG. 3. Side walls 60 resiliently maintain the radio forward of channel 46, so that the radio anchor clip must be flexed slightly away from the radio in order to be received in channel 46. This action positively secures the radio to panel 12 as described below.

As shown in FIG. 1, although side walls 60 are generally rectangularly shaped plates, the upper forward corner of each wall 60 is removed to form a slanted edge 62 between a top edge 64 and a forward edge 66. Slanted edges 62 assist in the mounting of the radio on mount 10 as described below and also eliminate the sharp upper corners which may injure a person accidentally striking the bracket.

Preferably, mounting panel 12 is formed from a single bent strip of material welded or otherwise affixed to leg 14 of support bracket 11. Alternatively, connecting leg 14 may have a central region offset forwardly to form channel 46, while the outer edges of leg 14 may be bent forward to form side walls 60 integrally therewith. The entire bracket can be molded as a single integral unit from a suitable plastic material such as high impact styrene. It could also be formed as two elements from plastic and assembled by a suitable bonding agent.

The radio mount 10 is preferably coated with a suitable type of resilient material. A coating of nylon to about 0.010 inches in thickness, applied as by the fluidized bed coating process, is satisfactory. The nylon coating prevents corrosion of the bracket and scratching or marring of the surface of the radio and also eliminates sharp edges which may accidentally injure a user.

A typical portable marine radio 70 is shown in FIG. 1, having an elongated bayonet anchor clip 72 on the radio housing back. Clip 72 is normally used to hook radio 70 to the user's belt. An elongated rectangular transmit/receive switch 74 is located on one side of radio 70. When radio 70 is mounted on mount 10 as shown in FIGS. 1 and 3, anchor clip 72 slides into channel 46 through the open upper end with the radio sides pressed between and embraced by side walls 60. Anchor clip 72 has an enlarged lower end 76, FIG. 1, that protrudes through the open bottom of channel 46 to assist in retaining securing clip 72 in channel 46.

As radio 70 is mounted on mount 10, radio 70 is tilted slightly so that anchor clip 72 may be telescopingly received into channel 46. Slanted edges 62 accommodate the tilted orientation of radio 70 during the initial insertion of anchor clip 72, and also form sloped bearing surfaces that contact the radio sides as the radio is forced downward and rotated to the secured position. Since the pocket of panel 12 is slightly deeper than the portion of the radio received therein, as radio 70 is forced downward anchor clip 72 is flexed away from the radio slightly and side walls 60 are resiliently diverged. This resilient flexing of anchor clip 72 and side walls 60 in effect resiliently clamps radio 70 in the storage position so that radio 70 is positively locked onto mounting panel 12. Mounting panel 12 therefore prevents shifting of radio 70, but still permits the ready removal of radio 70 by a single upward motion.

As shown in FIG. 1, side walls 60 extend forward of connecting leg 14 so as to contact the side of switch 74 in order to increase the stability of the radio mounting. Alternatively side walls 60 may terminate shortly before contacting switch 74 so as to avoid interference with the operation of the radio controls. Slanted edges 62 thus also provide bearing surfaces that prevent interference with transmit/receive switch 74 or other protrusions from the sides of radio 70 by allowing side walls 60 to smoothly slide around such protrusions.

Figure 4:
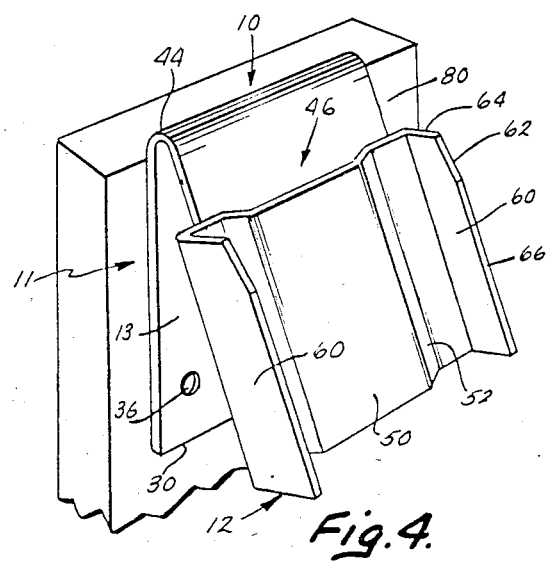
FIG. 4 is a perspective view of the radio mount of FIG. 1 shown mounted on a vertical surface.
Figure 5:
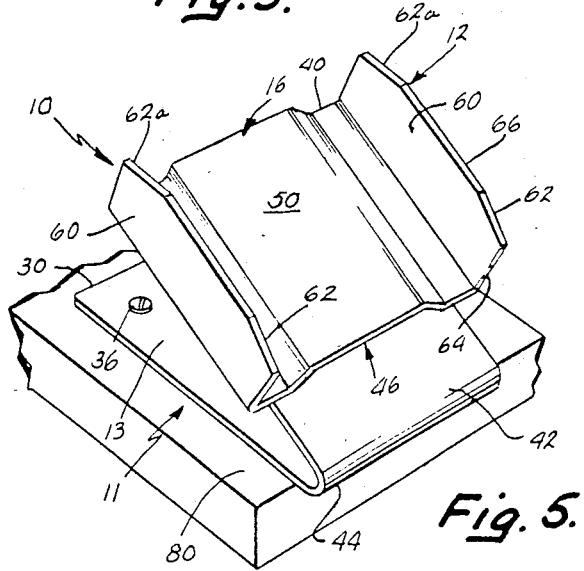
FIG. 5 is a perspective view of the radio mount of FIG. 1 shown alternatively mounted on a horizontal surface.

When radio 70 is mounted on radio mount 10, resilient bend 44 flexes and thus buffers plate 12 and radio 70 from shock and vibration such as that caused by wave action or engine operation. The lower end of radio 70 cantilevers downward from bend 44 so that the weight of radio 70 causes bend 44 to flex when securing leg 13 is jarred. As shown in FIG. 4, radio mount 10 is preferably mounted on a support surface 80 so that bend 44 and side wall upper edges 64 are located generally at the top of mount 10. However, some support surfaces 80, such as the horizontal surface shown in FIG. 5, require mount 10 to be mounted with mounting flange lower edge 40 located generally at the top of mount 10. Because the invention may be used on both vertical and horizontal supports it may be desirable to duplicate the cambers 62 as cambers 62a at the opposite ends of the side walls or wings 60. (FIG. 5).

Even though bend 44 is resilient when fabricated from steel, bend 44 may be bent to permanently deform and reposition connecting leg 14 at any required angle, such as is dicated by the angle of mounting surface 80. However, such permanent deformation is undertaken infrequently in order to avoid fatiguing bend 44. The angle between legs 13 and 14 is selected to provide for an immediate visual inspection of the controls on the face of radio 70, with requiring that radio 70 be removed from mount 10.

For example, for preferably mounting a typical portable marine radio that is approximately two and one-half inches wide and seven and one-quarter inches long, legs 13 and 14 are each approximately two and one-half inches high and two inches wide. Channel front wall 50 is approximately one inch wide and two inches high. Side walls 60 diverge so that forward edges 66 are spaced two and five-eighths inches apart and extend one inch from leg outer face 42.

It is to be understood that the above is a description of the preferred embodiments and various modifications or improvements may be made to the preferred embodiments without departing from the spirit of the invention disclosed herein. The scope of the protection provided is to be determined by the claims which follow and the breadth of interpretation which the law allows.

The embodiments of the invention in which an exclusive property or privilege is claimed are as follows:

1. A mount for a portable marine radio of the type having a resilient anchor clamp, said mount comprising:
    a support bracket having a pair of divergent legs joined at one end; and
    a radio receiving cradle formed on one of the legs of said support bracket, said cradle having a web portion spacing a pair of resilient side panels forming a radio receiving pocket therebetween and shaped to complement and seat against at least a portion of the side walls of the radio, said cradle having a substantially open upper end to provide sliding access for said radio therealong, said web portion including a channel aligned with said side panels for receiving said anchor clamp to secure the radio against unintentional movement lengthwise of said pocket and to urge the radio toward said web.

2. A mount as defined in claim 1 wherein said side panels are divergent and said pocket is deeper than the thickness of the portion of the radio received in the pocket whereby the radio is nested between and resiliently held against lateral movement by said side panels.

3. A mount as defined in claim 1 wherein said channel is open at both ends whereby the anchor clip of a radio can be inserted from either end.

4. A mount as defined in claim 5 wherein the central portion of said web is offset away from said support bracket to form said channel, said channel being open at both ends whereby the anchor clip of a radio can be inserted from either end.

5. A mount for a portable marine radio of the type having a resilient anchor clamp, said mount comprising:
    a support bracket having a pair of divergent legs joined at one end; and
    a radio receiving cradle secured to one of the legs of said support bracket, said cradle having a web portion seated against the support bracket and a pair of resilient divergent side panels forming a radio receiving pocket therebetween, said cradle having a substantially open upper end to provide sliding access for said radio therealong, one of said one leg and said web being offset to form a channel for receiving said another clamp to secure the radio against unintentional movement lengthwise of said pocket and to urge the radio toward said web.

6. A mount as defined in claim 5 wherein said pocket is deeper than the thickness of the portion of the radio received in the pocket whereby the radio is nested between and resiliently held against lateral movement by said side panels.

7. A mount as defined in claim 6 wherein the side walls of the portion of the radio received in the pocket are divergent forwardly toward the front of the radio at an angle complimentary to that of the side panels.

8. A mount as defined in claim 1 wherein said divergent legs are joined by a resilient hinge member.

9. A mount as defined in claim 5 wherein said divergent legs are joined by a resilient hinge member.

10. A mount for a portable marine radio of the type having anchor means for detachably and slidably securing it to a support, said mount comprising:
    a cradle having back and side panels defining a radio receiving pocket therebetween open at both ends and shaped to compliment and seat against at least a portion of the side walls of the radio, said side panels being resilient and spaced to resiliently seat against the radio; channel means to receive said anchor means; and
    a support bracket having a pair of legs arranged in a "V", one of said legs being a support surface contacting member and the other being secured to said cradle; a shock and vibration absorbing resilient hinge connecting said legs at the apex of the "V".

* * * * *